UNITED STATES PATENT OFFICE.

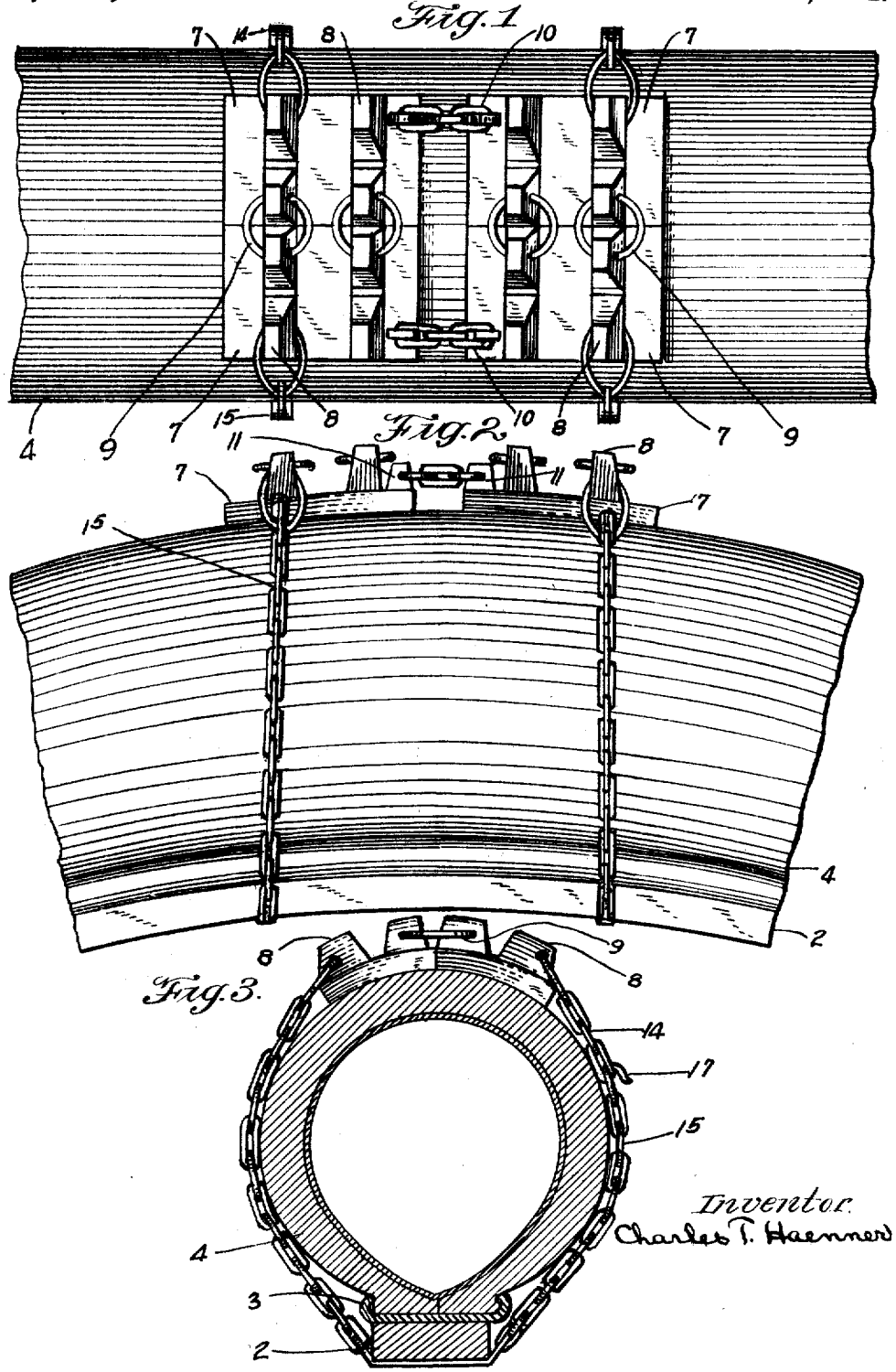

CHARLES T. HAENNER, OF CLEVELAND, OHIO.

NON-SKID DEVICE.

1,398,719.   Specification of Letters Patent.   Patented Nov. 29, 1921.

Application filed January 27, 1920. Serial No. 354,495.

*To all whom it may concern:*

Be it known that I, CHARLES T. HAENNER, a citizen of the United States of America, residing at Cleveland, in the county of Cuyahoga and State of Ohio, have invented certain new and useful Improvements in Non-Skid Devices; and I hereby declare the following to be a full, clear, and exact description of the invention, such as will enable others skilled in the art to which it pertains to make and use the same.

This invention relates to improvements in non-skid attachments for automobile tires.

The object of this invention is to provide a device or attachment of this character which will be very effective in preventing tires from slipping or skidding on slippery pavements and which will also serve as a mud-hook on wet or soft ground.

A further object of my invention is to provide a device for the above mentioned purposes which will be cheap to manufacture and which can be easily placed on or taken off of a tire.

My invention therefore consists of the features of construction and combination of parts, hereinafter described in the specification, particularly pointed out in the claim and illustrated in the accompanying drawings.

Referring to the accompanying drawings. Figure 1 shows a portion of an automobile tire with one of my non-skid devices applied thereto. Fig. 2 is a side view of the same and Fig. 3 is an end view of the same.

Again referring to the drawings 2 represents the felly of a wheel, 3 represents the rim and 4 the tire. Each of my non-skid devices is a unit comprising four distinctively formed members flexibly connected together. The members are arranged in pairs and the members forming each pair are butted transversely but the pairs are spaced longitudinally a predetermined distance apart. Each member comprises a rectangular plate, 7, curved to conform to the circumferential and transverse curvature of the tire. On the face of each plate are formed two rows of lugs, 8, which run transversely of the tread of the tire. The sides of these lugs, 8 are beveled so that the lugs have flat or blunt points. As is clearly shown in Fig. 1 of the drawing, the beveled portions of the lugs of the entire series of lugs on the unit are upon the same side thereof, and their opposite faces are radially disposed. The adjacent edges of the plates 7, of the members which are arranged in pairs are brought close together with the rows of lugs 8 in alinement and the adjacent lugs on the two plates are flexibly connected by means of coupling members or rings 9. Each plate of one pair of plates is connected to the opposite plate of the other pair of plates by a short length of chain, 10, the ends of which are secured to ears or projections 11 formed on the plates. Each pair of plates is provided with independent means for securing said plates to the tire comprising chain sections shown at 14 and 15. Each chain section is secured to the outer corner of a plate, preferably to one lug thereon and is then carried around the tire and felly and the ends of the chain sections are united together by means of a hook 17, on one section which engages a link on the other section.

By the arrangement described I am able to provide a very efficient non-skid device. The lugs and plates afford ample means for engagement with the surface traveled over and my method of flexibly connecting the members of the device together and also to the tire permit the freedom of movement necessary in a device of this character.

What I claim is:—

A non-skid device comprising a single unit consisting of four distinctively formed members, each member of said unit being a rectangular plate curved to conform to the curvature of a tire, each plate having a double row of lugs extending transversely thereof, the entire series of lugs of said unit having radial faces on one side thereof, and beveled faces upon the opposite side of said series, means flexibly connecting said members transversely and longitudinally, and flexible elements attached to the lugs at the respective outer corners of said members for connecting the unit to the tire.

In testimony whereof, I sign the foregoing specification in the presence of two witnesses.

CHARLES T. HAENNER.

Witnesses:
V. C. LYNCH,
R. H. BENDER.